(12) United States Patent
Riad et al.

(10) Patent No.: US 10,730,413 B1
(45) Date of Patent: Aug. 4, 2020

(54) VEHICLE SEAT ASSEMBLY WITH CHILD CAR SEAT RAIL SYSTEM

(71) Applicant: Honda Motor Co., Ltd., Tokyo (JP)

(72) Inventors: Yousuf S. Riad, Ostrander, OH (US); John Barlow, Jr., Marysville, OH (US); Mark D. Bartlett, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/364,321

(22) Filed: Mar. 26, 2019

(51) Int. Cl.
*B60N 2/28* (2006.01)
*B60N 2/02* (2006.01)
*B60N 2/06* (2006.01)
*B60N 2/08* (2006.01)

(52) U.S. Cl.
CPC ......... *B60N 2/2839* (2013.01); *B60N 2/0292* (2013.01); *B60N 2/062* (2013.01); *B60N 2/0806* (2013.01); *B60N 2/2887* (2013.01)

(58) Field of Classification Search
CPC .... B60N 2/2839; B60N 2/0292; B60N 2/062; B60N 2/0806; B60N 2/2887
USPC .............................. 297/250.1, 256.1, 256.16
See application file for complete search history.

(56) References Cited

U.S. PATENT DOCUMENTS

| | | | | |
|---|---|---|---|---|
| 2,865,427 A | * | 12/1958 | Garfield | B60N 2/245 297/256.1 |
| 4,936,627 A | * | 6/1990 | Guim | B60N 2/3084 297/238 |
| 6,283,545 B1 | | 9/2001 | Ernst | |
| 6,572,189 B1 | * | 6/2003 | Blaymore | B60N 2/2806 297/256.1 |
| 6,793,283 B1 | | 9/2004 | Sipos | |
| 7,891,721 B2 | | 2/2011 | Pesach | |
| 8,702,169 B2 | | 4/2014 | Abadilla et al. | |
| 2004/0178669 A1 | | 9/2004 | Lady et al. | |
| 2007/0120404 A1 | * | 5/2007 | Bellows | A47D 13/10 297/256.16 |
| 2011/0043014 A1 | | 2/2011 | Templaman et al. | |
| 2012/0032466 A1 | * | 2/2012 | Line | B60N 2/062 296/65.12 |

FOREIGN PATENT DOCUMENTS

| | | |
|---|---|---|
| EP | 1950078 | 7/2008 |
| FR | 2917021 | 12/2008 |
| JP | 2005193775 | 7/2005 |
| WO | 2001021433 | 3/2001 |
| WO | 2013024959 | 2/2013 |

* cited by examiner

*Primary Examiner* — Anthony D Barfield
(74) *Attorney, Agent, or Firm* — Rankin, Hill & Clark LLP

(57) ABSTRACT

A vehicle seat assembly includes a seat base connected to a seat back. The seat base has a cushion portion and a support portion for supporting the cushion portion. The cushion portion is movable between a seating condition where the cushion portion forms a seating surface and non-seating condition where the cushion portion is tilted forward relative to the seat back about a forward end portion of the support portion. A rail system is mounted to the support portion. In the seating condition the rail system is covered by the cushion portion, and in the non-seating condition the rail system is configured to have mounted thereto an associated child car seat. The rail system is configured to move the associated child seat along a lateral direction of the vehicle seat assembly between a first outboard seating location and a center seating location defined by the seat base.

20 Claims, 9 Drawing Sheets

VEHICLE SEAT ASSEMBLY WITH CHILD CAR SEAT RAIL SYSTEM

BACKGROUND

Child car seats are required for infants and small children traveling in vehicles. Many conventional child car seats are heavy and relatively difficult to install in the rear seat of a vehicle. In addition, because the space associated with the rear seat is limited, many parents often find it difficult to properly place the child car seat atop the rear seat of the vehicle. Obtaining access to the child car seat or the child often requires the parent to awkwardly position himself or herself inside the vehicle, and this awkward positioning can result in inconvenience to both the parent and the child seated in the child car seat.

BRIEF DESCRIPTION

According to one aspect, a vehicle seat assembly comprises a seat base connected to a seat back. The seat base has a cushion portion and a support portion for supporting the cushion portion. The cushion portion is movable between a seating condition where the cushion portion forms a seating surface for accommodating an associated seated passenger and non-seating condition where the cushion portion is tilted forward relative to the seat back about a forward end portion of the support portion. A rail system is mounted to the support portion. In the seating condition the rail system is covered by the cushion portion, and in the non-seating condition the rail system is configured to have mounted thereto an associated child car seat. The rail system is configured to move the associated child seat along a lateral direction of the vehicle seat assembly between a first outboard seating location and a center seating location defined by the seat base.

According to another aspect, a vehicle seat assembly comprises a seat base connected to a seat back. The seat base has a cushion portion and a support portion for supporting the cushion portion. The cushion portion is movable between a seating condition where the cushion portion forms a seating surface for accommodating an associated seated passenger and non-seating condition where the cushion portion is tilted forward relative to the seat back about a forward end portion of the support portion. A rail system is mounted to the support portion. In the seating condition the rail system is covered by the cushion portion, and in the non-seating condition the rail system is configured to have mounted thereto an associated child car seat. The rail system includes a pair of slide rails extended in a lateral direction of the vehicle seat assembly between a first outboard seating location and a center seating location defined by the seat base and a platform slidably mounted to the slide rails. The platform is configured to have mounted thereto the associated child car seat.

According to another aspect, a method of securing an associated child car seat to a vehicle seat assembly is disclosed. The vehicle seat assembly includes a seat base connected to a seat back. The seat base has a cushion portion and a support portion for supporting the cushion portion. The cushion portion includes a first outboard cushion portion and a center cushion portion. Each of the first outboard cushion portion and the center cushion portion is independently movable between a seating condition and non-seating condition. A rail system is mounted to the support portion and selectively covered by the cushion portion. The rail system is configured to have mounted thereto the associated child car seat. The rail system includes a pair of slide rails extended in a lateral direction of the vehicle seat assembly between the first outboard cushion portion and the center cushion portion and a platform slidably mounted to the slide rails. The method comprises positioning the first outboard cushion portion in the non-seating condition; mounting the associated child car seat to the platform; positioning the center cushion portion in the non-seating condition; sliding the platform having the associated child car seat mounted thereto in alignment with the center cushion portion; and positioning the first outboard cushion portion in the seating condition.

DETAILED DESCRIPTION

Figure 1:
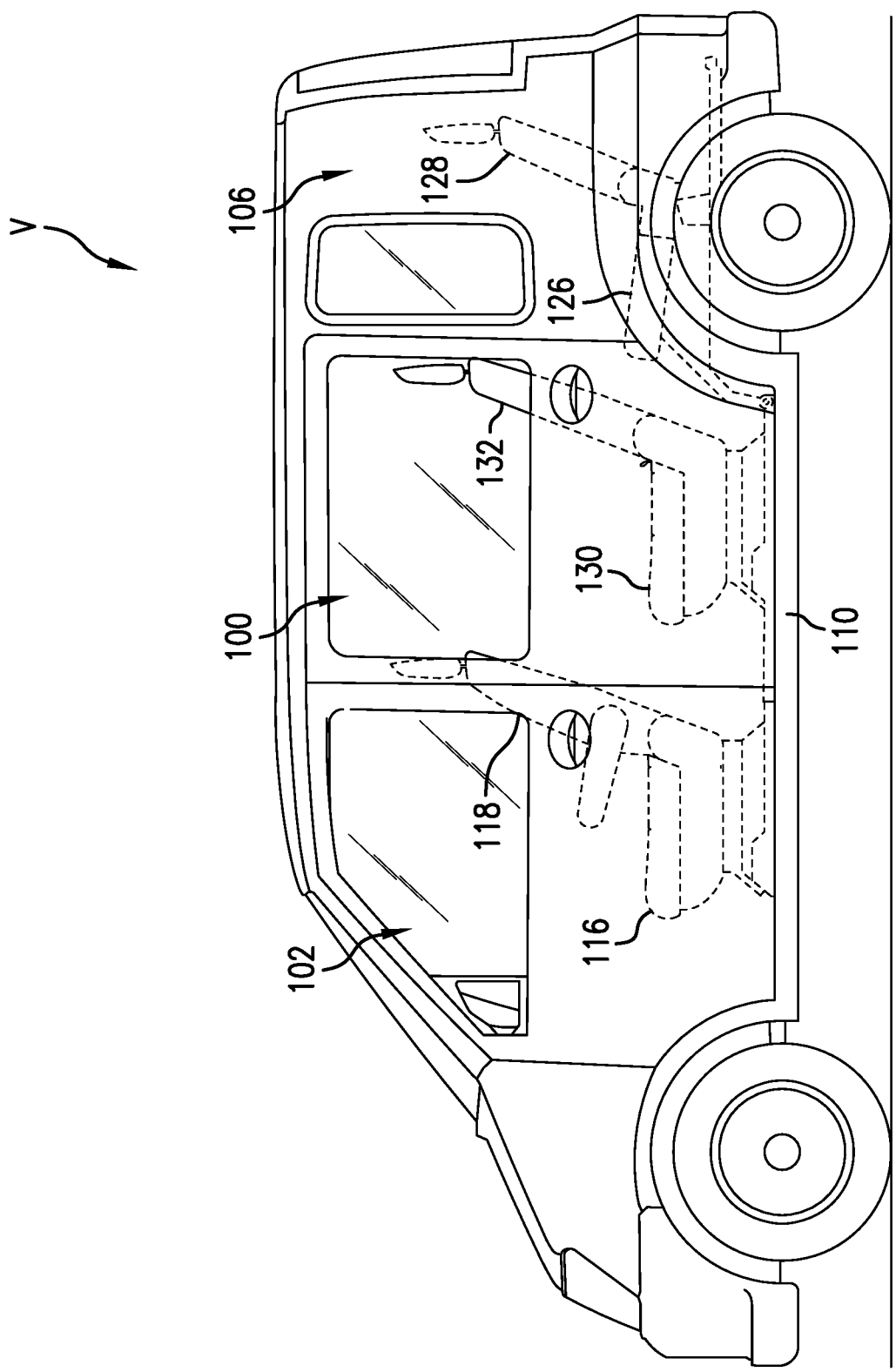
FIG. 1 is a schematic view of a vehicle including a vehicle seat assembly according to the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 schematically illustrates an exemplary vehicle seat assembly 100 adapted for use in connection with a vehicle V having an increased cargo and passenger carrying capacity. Although, it should be appreciated that the vehicle seat assembly 100 can be implemented in alternative type vehicles. With respect to a longitudinal direction of the vehicle, the illustrated vehicle generally includes a first or front row seat assembly 102 and a third or rear row seat assembly 106. The exemplary vehicle seat assembly is depicted as a second or middle row seat assembly; although, this is not required. Each seat assembly is coupled to a floor 110 of the vehicle.

The front row seat assembly 102 includes a seat base 116 for supporting a seated passenger (e.g., a driver) and a seat back 118 pivotally coupled to the seat base. The seat base 116 can be moveably mounted to the floor 110. Typically, the front seat assembly 102 can be either a manually adjustable seat or can be provided with electric motors to provide automated adjustment and electronic control of the front seat. The rear row seat assembly 106 includes a seat base 126 for supporting a seated passenger and a seat back 128 coupled to the seat base 126. The exemplary middle row seat assembly 100 includes a seat base 130 and a seat back 132 connected to the seat base. As known and understood by those skilled in the art, the seat backs of the seat assemblies 100, 106 can be foldable over the seat bases to increase a rear cargo area of the vehicle V. Further, aside from a lateral dimension, the seat assemblies 100, 106 can be similar to one another.

Figure 2:
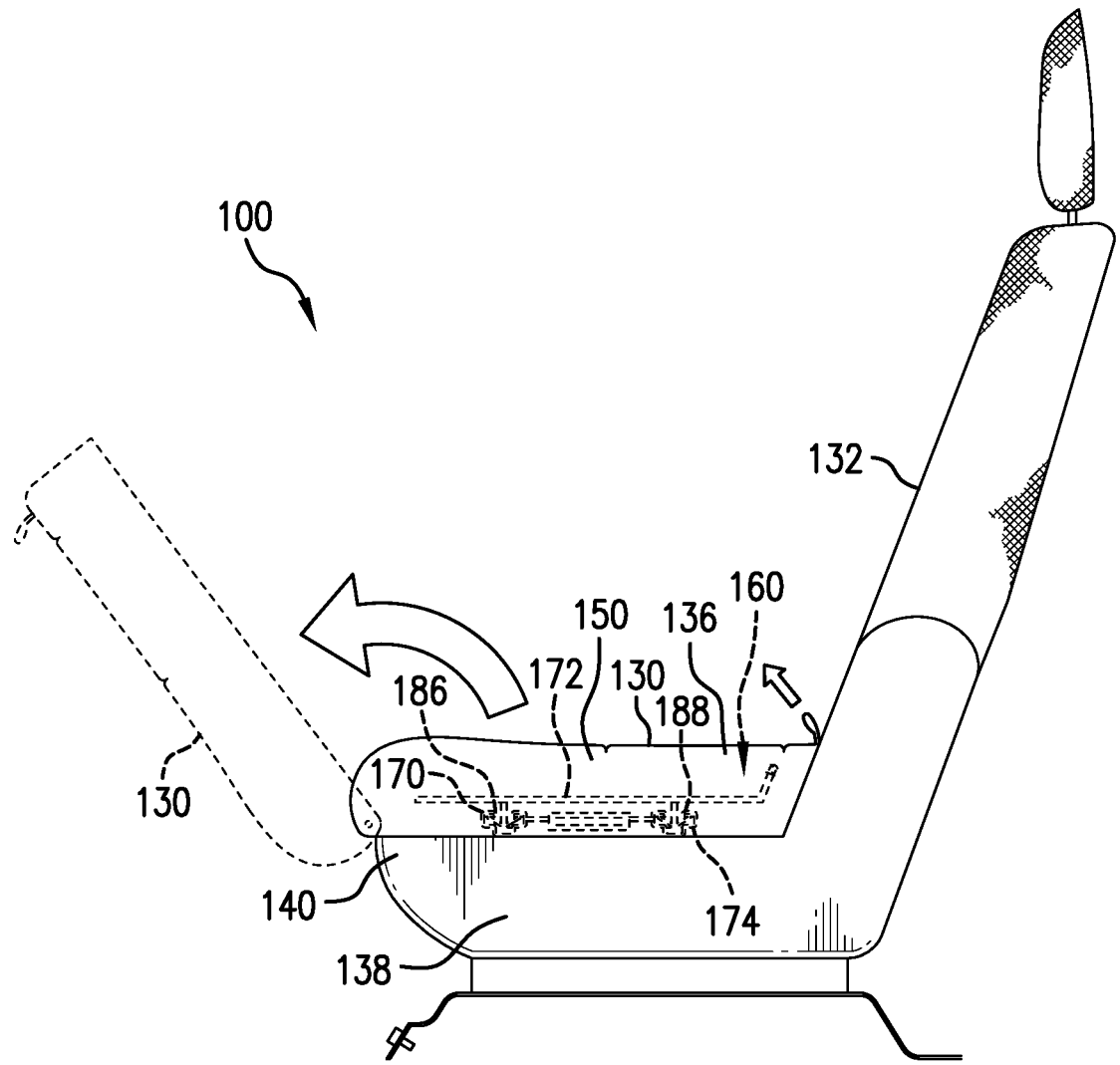
FIGS. 2 and 3 depict a first outboard cushion portion of a seat base of the vehicle seat assembly moved from a seating condition to a non-seating condition.
Figure 3:
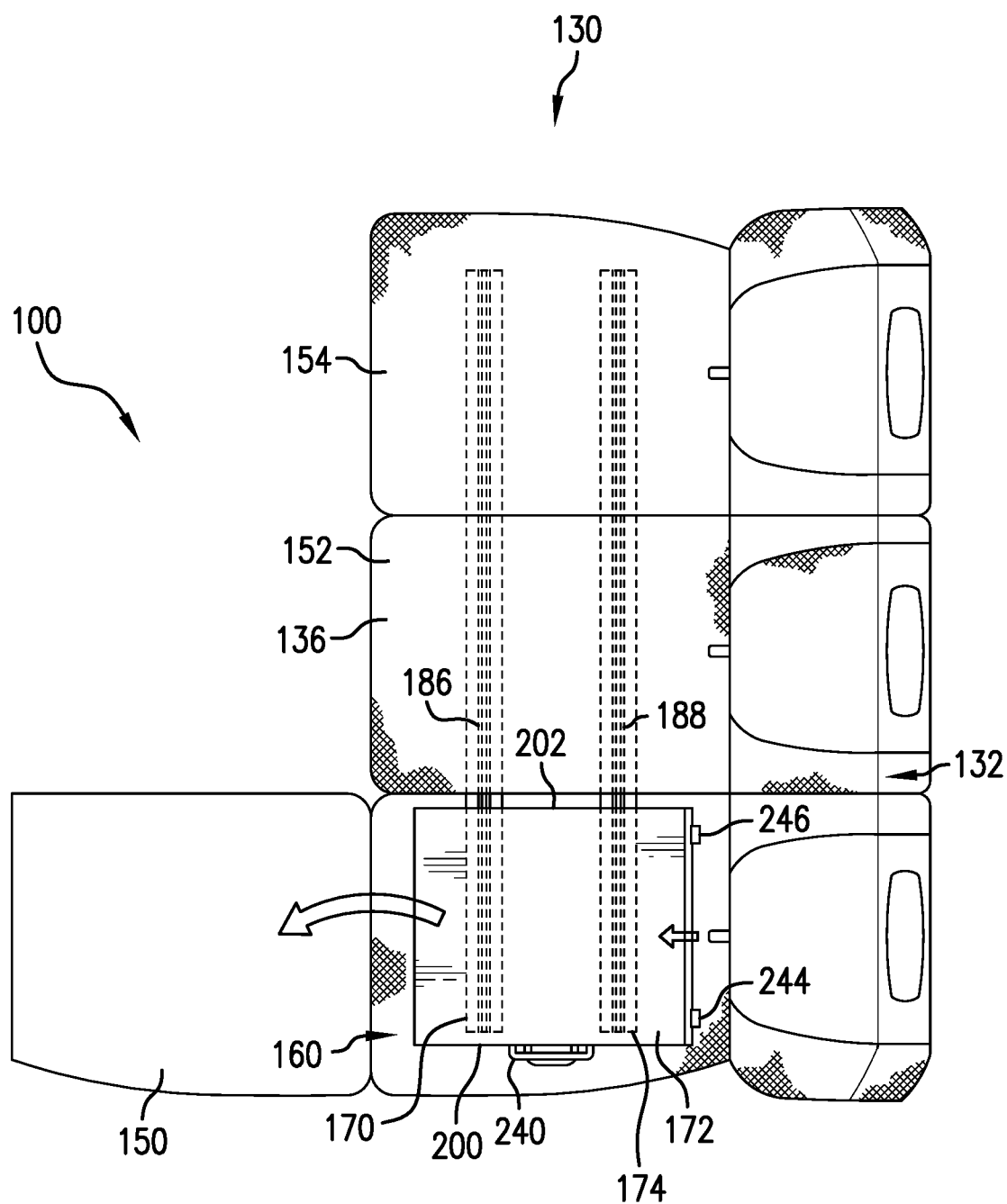

As shown in FIGS. 2 and 3, the seat base 130 has a cushion portion 136 and a support portion 138 for supporting the cushion portion. The cushion portion 136 is movable between a seating condition where the cushion portion forms a seating surface for accommodating a seated passenger and non-seating condition where the cushion portion is tilted forward relative to the seat back 132 about a forward end portion 140 of the support portion 138. More particularly, the second row seat assembly 100 is a split-bench/split back type seat, wherein the cushion portion 136 includes a first outboard cushion portion 150, a center cushion portion 152, and a second outboard cushion portion 154. Each of the first outboard cushion portion 150, the center cushion portion 152, and the second outboard cushion portion 154 is independently movable between the seating condition and the non-seating condition. Further, in the seating condition the first outboard cushion portion 150 defines a first outboard seating location for a seated passenger, the center cushion portion 152 defines the center seating location for a seated passenger, and the second outboard cushion portion 154 defines a second outboard seating location for a seated passenger.

With particular reference to FIGS. 4-7, a rail system 160 is mounted to the support portion 138 of the middle row seat assembly 100. In the seating condition the rail system 160 is covered by the cushion portion 136, and in the non-seating condition the rail system 160 is configured to have mounted thereto an associated child car seat 162. Although the child car seat 162 is being illustrated herein in the form of a combined infant carrier 164 and support base 166, those skilled in the art will readily recognize that there are many other styles and types of child car seats that are provided depending on the desired seating arrangement and the different sizes, ages and weights of child occupants. Therefore it is to be understood that the child car seat 162 illustrated herein, and the use of the term "child car seat" throughout this disclosure and claims is to represent and identify any and all forms of child car seat arrangements. According to the present disclosure, the rail system 160 is configured to move the child car seat 162 along a lateral direction of the vehicle seat assembly 100 between at least the first outboard seating location and the center seating location defined by the seat base 124. As shown, the rail system 160 is configured to move the child car seat 162 along the lateral direction between the first outboard seating location and the second outboard seating location.

The rail system 160 includes at least one slide rail 170 and a platform 172 slidably mounted to the at least one slide rail. The at least one slide rail 170 is extended in the lateral direction of the vehicle seat assembly 100 between at least the first outboard seating location (defined by the first outboard cushion portion 150) and the center seating location (defined by the center cushion portion 152). The platform 172 is configured to have mounted thereto the associated child car seat 162 and is selectively movable along the at least one slide rail 170 in a plane substantially parallel with respect to an upper surface of the support portion 138. It should be appreciated that the upper surface of the platform 172 can have a non-slip surface which increases the coefficient of friction between the child car seat 162 and the platform 172, and tends to reduce slippage between the child car seat 162 and the platform 172.

According to the depicted embodiment, the rail system 160 includes a pair of slide rails 170, 174 extended in the lateral direction between the first outboard seating location and the center seating location, and the platform 172 is slidably mounted to each of the slide rails. Further depicted, the slide rails 170, 174 can be extended in the lateral direction between the first outboard seating location and the second outboard seating location (defined by the second outboard cushion portion 154). The slide rails 170, 174 are shown positioned atop the support portion 138 of the seat base 130; although, it should be appreciated that the side rails 170, 174 can be at least partially embedded in the support portion 138 to position the platform 172 slightly above the support portion 138. This allows the cushion portion 136 in the seating condition to lay substantially flush against the support portion 138 without any noticeable height difference between, for example, the first outboard cushion portion 150 covering the platform 172 and each of the center cushion portion 152 and second outboard cushion portion 154.

In the depicted aspect, each of the slide rails 170, 174 includes a body 180, 182 having an elongated channel 186, 188 defined in an upper surface thereof. Each of the channels 186, 188 is sized to slidably receive a guide post 192, 194 depending from the platform 172. The guide posts 192, 194 can extend laterally between side portions 200, 202 of the platform 172; although, this is not required. To maintain the guide posts 192, 194 within the elongated channels 186, 188, each of the slide rails 170, 174 can house a securement member 210, 212 configured to securely engage the respective guide post 192, 194. By way of example, each of the securement members 210, 212, which can extend substantially the length of each slide rail 170, 174, can be V-shaped in cross-section with a lower elongated channel 216, 218, and each of the guide posts 192, 194, which can have an upside down capital T shape in cross-section, is securely received in the respective elongated channel 216, 218. Although, alternative manners for securing the guide posts within the slide rails are contemplated. It should further be appreciated that the slide rails 170, 174 can be provided with ball-bearings to facilitate smooth sliding of the platform 172.

The exemplary rail system 160 further includes a lock device 220 mounted to one of the slide rails 170, 174 or the platform 172 for locking the platform 172 at each of the first outboard seating location, the center seating location and second outboard seating location. According to one aspect, the lock device 220 is mounted to the platform 172 and includes lock pins 224, 226 for selectively engaging the respective slide rails 170, 174. More particularly, the body 180, 182 of each slide rail 170, 174 includes an aperture 230, 232 located at each of the seating locations described above, the apertures sized to receive the lock pins 224, 226. A handle 240 is coupled to the lock pins 224, 226 for moving the lock pins out of engagement with the slide rails 170, 174. Therefore, actuation of the handle 240 moves the lock pins 224, 226 out of the apertures 230, 232 allowing the platform 172 to slide between the seating locations. The handle 240 also allows a parent to easily move the platform 172 into a desired seating location. The lock pins 224, 226 can be spring biased so that when the lock pins are again aligned with the apertures at one of the seating locations, the lock pins 224, 226 are biased into the apertures thereby locking the platform 272 to the slide rails 170, 174 at that seating location.

As indicated previously, the platform 172 is configured to have the child car seat 162 releasably attached thereto.

According to the present disclosure, the platform 172 includes at least one anchor 244 for attachment of the child car seat 162 to the platform. In the depicted aspect, a pair of anchors 244, 246 is fixed to the platform, one adjacent each side portion 200, 202 of the platform 172. The anchors 244, 246 can be similar to known child seat anchors provided on the vehicle seat assembly 100, which are typically U-shaped rings or loops, in order to be compatible with LATCH (Lower Anchors and Tethers for CHildren)-compliant child car seats.

Figure 4:
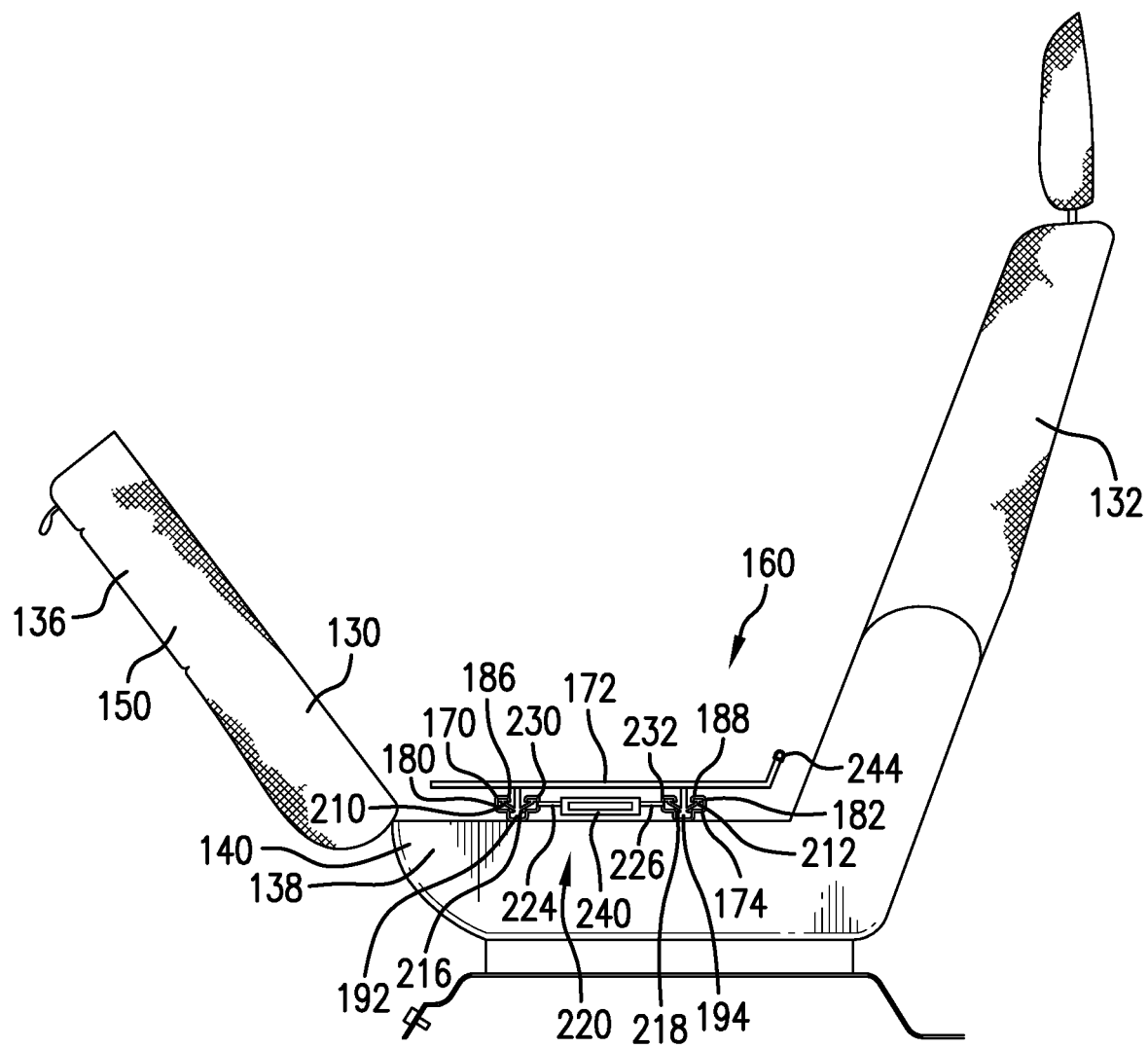
FIG. 4 depicts a platform of a rail system of the vehicle seat assembly positioned to have mounted thereto an associated child car seat, a lock device of the rail system is in a locked state.
Figure 5:
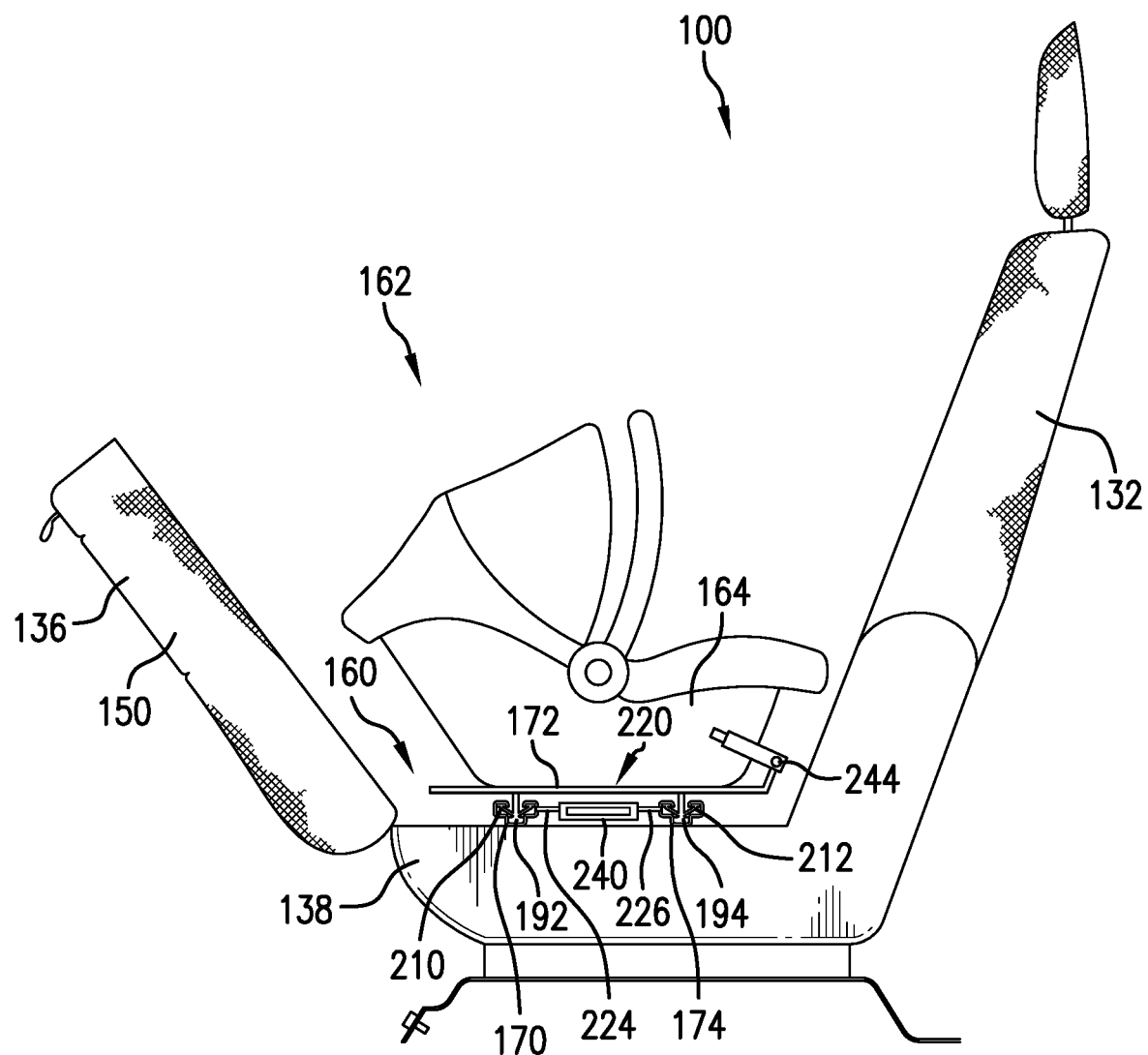
FIG. 5 depicts an infant carrier of the child car seat attached to the platform.
Figure 6:
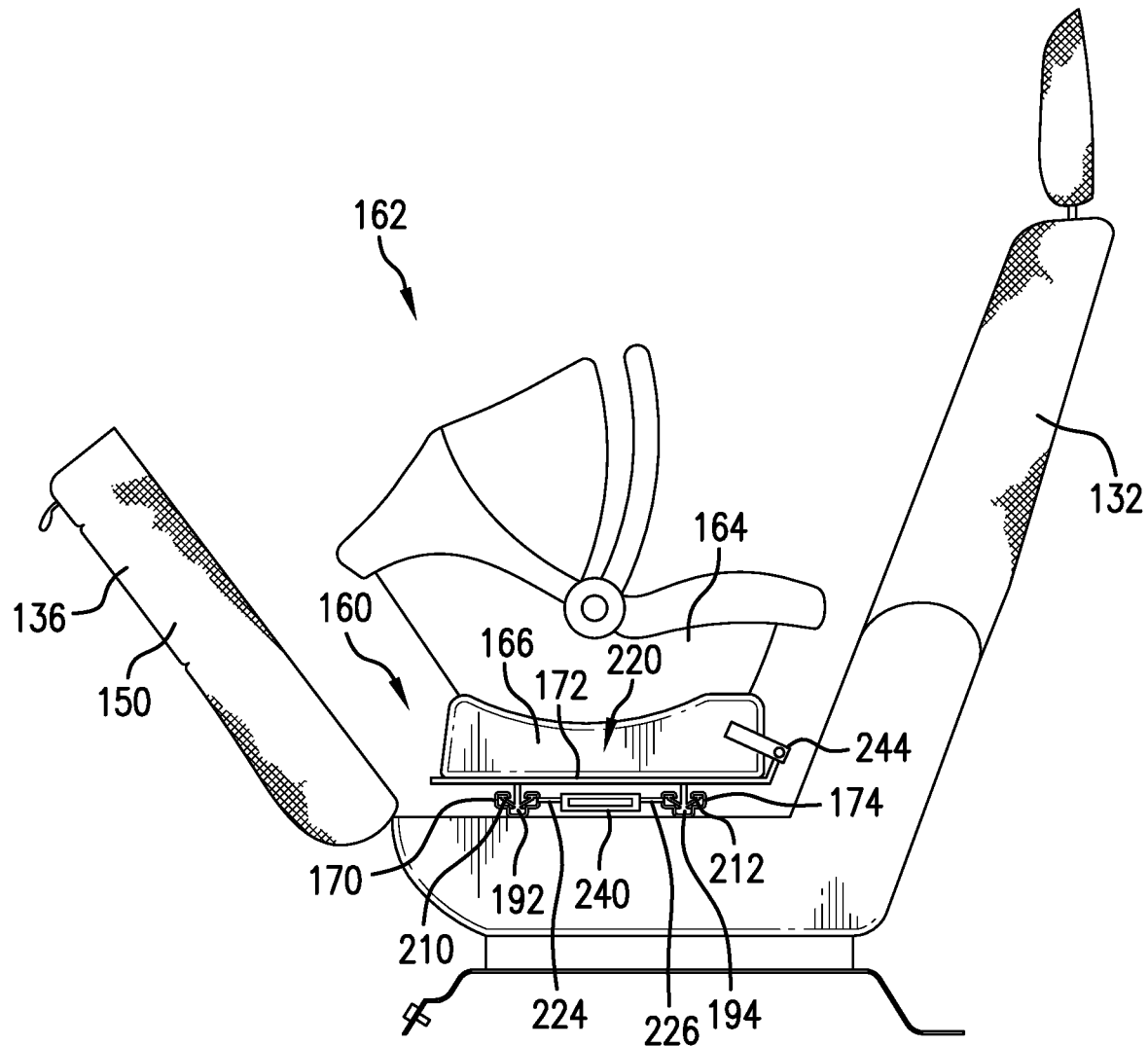
FIG. 6 depicts a support base of the child car seat attached to the platform and the infant carrier mounted to the support base.
Figure 7:
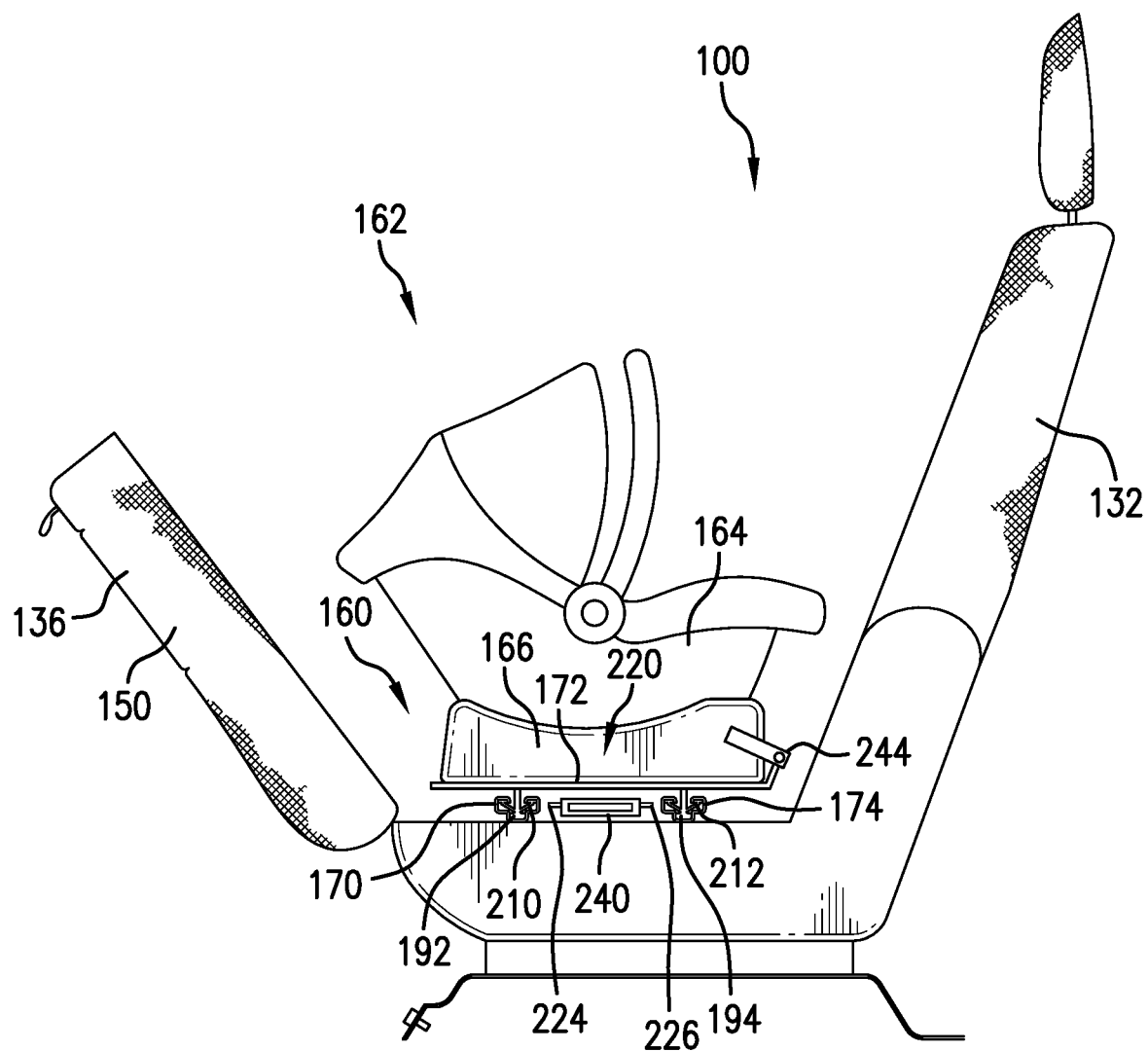
FIG. 7 depicts the lock device of the rail system in an unlocked state.
Figure 8:
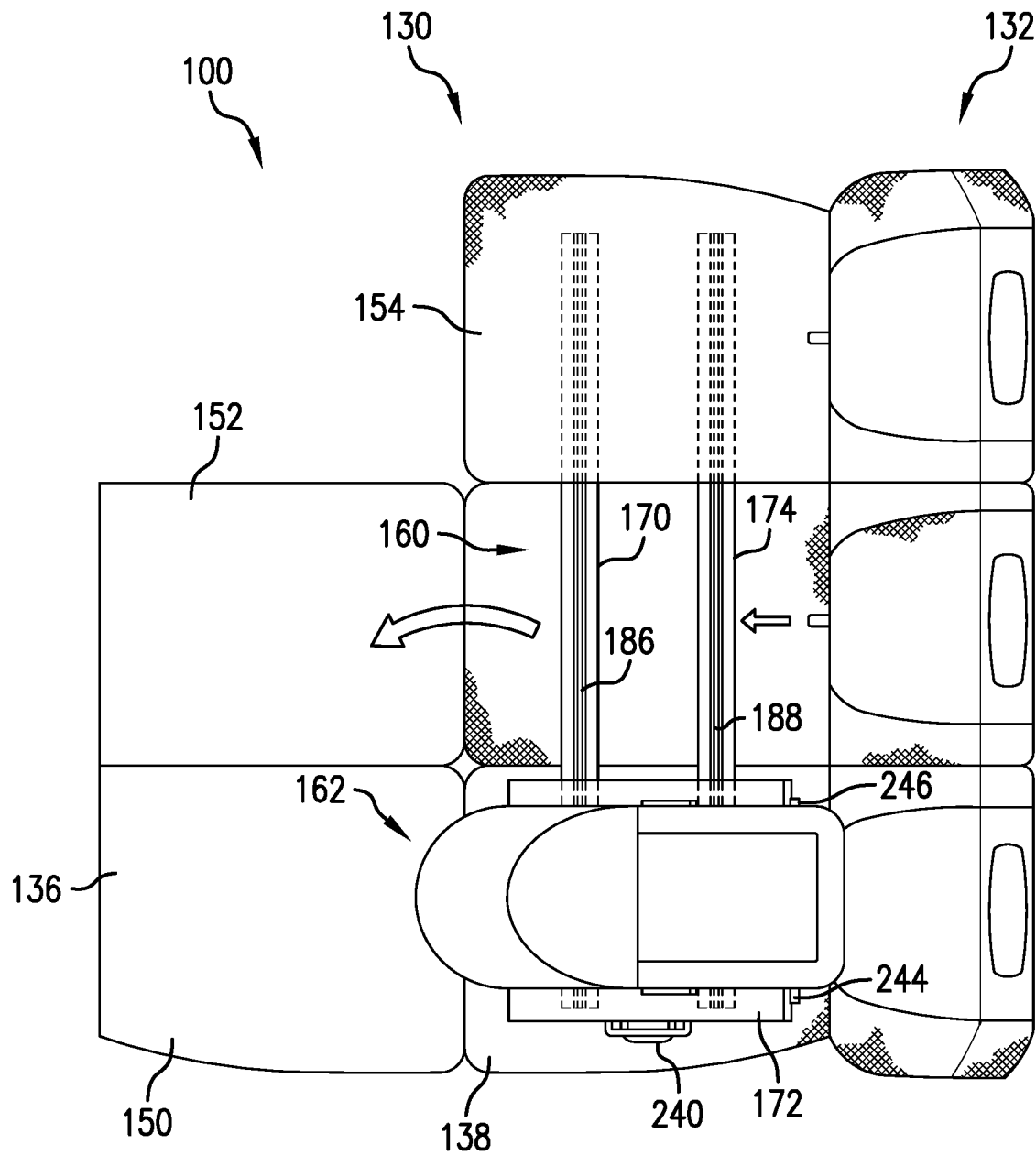
FIGS. 8 and 9 depict the platform together with the child car seat being moved from the first outboard seating location to a center seating location of the seat base of the vehicle seat assembly.
Figure 9:
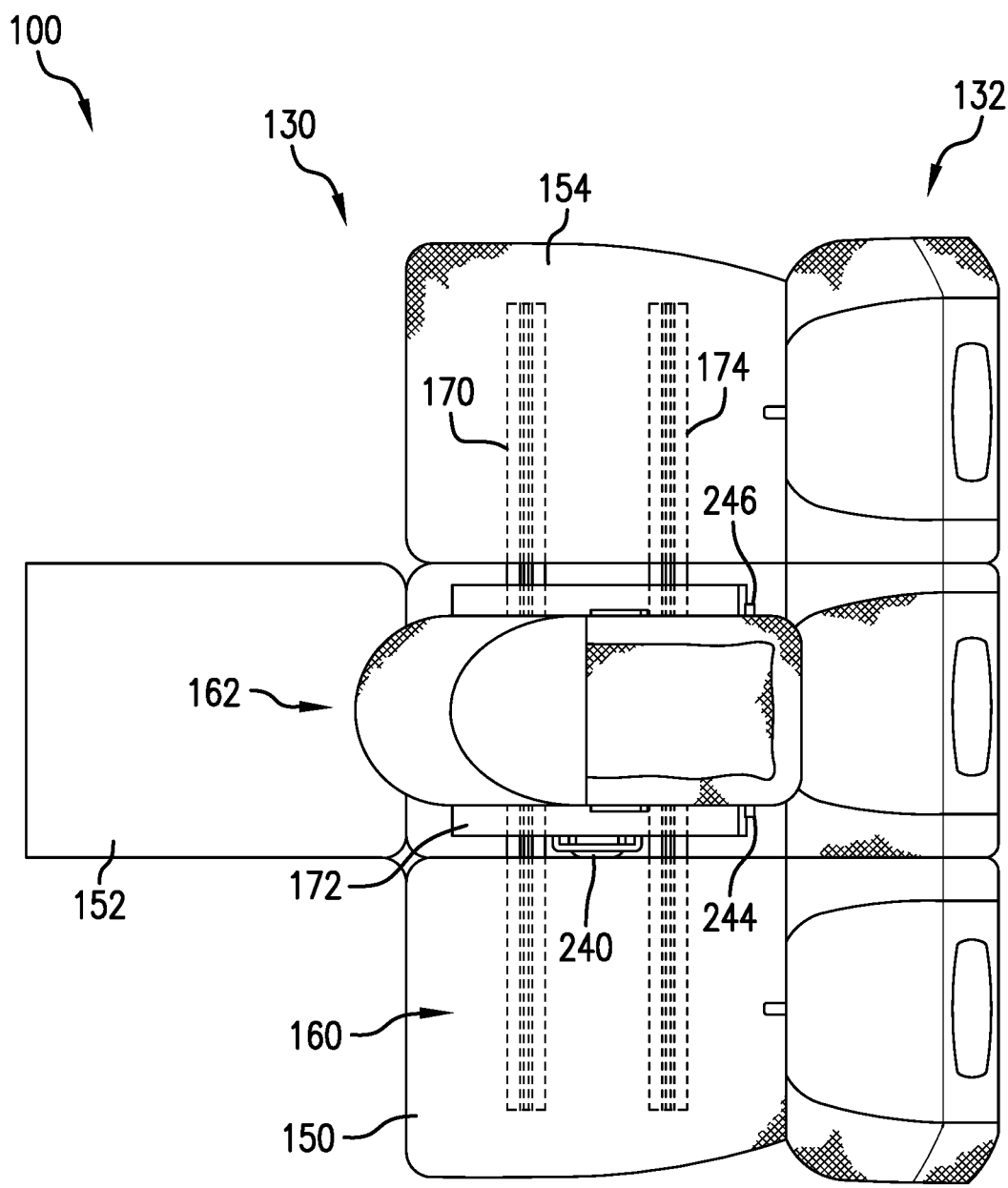

FIGS. 2 and 3 depict the first outboard cushion portion 150 of the seat base 130 moved from the seating condition to the non-seating condition. In FIG. 4, the platform 172 of the exemplary rail system 160 is positioned to have mounted thereto the child car seat 162. In this ready position, the lock pins 224, 226 of the lock device 220 are engaged to the respective slide rails 170, 174. In FIG. 5, the infant carrier 164 is attached to the platform 172, for example, via child seat tethers attached to the anchors (only anchor 244 is visible). In FIG. 6, the support base 166 is attached to the platform 172 and the infant carrier 164 is mounted to the support base 166. In FIG. 7, the handle 240 is actuated, which moves the lock pins 224, 226 out of engagement from the slide rails 170, 174. The platform 172 together with the child car seat 162 can then be moved along the slide rails 170, 174 to a desired seating location. FIGS. 8 and 9 show the platform 172 together with the child car seat 162 being moved from the first outboard seating location to the center seating location. The center cushion portion 152 is also moved from the seating condition to the non-seating condition. The platform 172 is slid to the center seating location, wherein the lock pins 224, 226 reengage the slide rails 170, 174. The first outboard cushion portion 150 is moved from the non-seating condition back to the seating condition. FIGS. 8 and 9 also depict the platform 172 sized smaller than each of the first outboard cushion portion 150 and the center cushion portion 152. Accordingly, with the platform 172 secured at the first outboard seating location the platform does not contact the center cushion portion 152 in the seating condition, and with the platform 172 secured at the center seating location the platform does not contact the first outboard cushion portion 150 in the seating condition.

As is evident from the forgoing, a method of securing the child car seat 162 to the vehicle seat assembly 100 is disclosed. The exemplary method comprises positioning the first outboard cushion portion 150 in the non-seating condition; mounting the child car seat 162 to the platform 172; positioning the center cushion portion 152 in the non-seating condition; sliding the platform 172 having the child car seat 162 mounted thereto in alignment with the center cushion portion 152; and positioning the first outboard cushion portion 150 in the seating condition. The mounting step includes attaching the child car seat 162 to the at least one anchor 244, 246. The method further includes locking the platform 172 to at least one of the slide rails 170, 174 prior to the mounting step; unlocking the platform 172 from the one slide rail 170, 174 prior to the sliding step; and locking the platform 172 to the one slide rail 170, 174 after the platform 172 is in alignment with the center cushion portion 152 in the non-seating condition. The method further includes engaging the one slide rail 170, 174 with the lock pin 224, 226, and moving the handle 240 to move the lock pin out of engagement with the one slide rail.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat assembly comprising:
a seat base connected to a seat back, the seat base having a cushion portion and a support portion for supporting the cushion portion, the cushion portion movable between a seating condition where the cushion portion forms a seating surface for accommodating an associated seated passenger and non-seating condition where the cushion portion is tilted forward relative to the seat back about a forward end portion of the support portion,
wherein a rail system is mounted to the support portion, in the seating condition the rail system is covered by the cushion portion, and in the non-seating condition the rail system is configured to have mounted thereto an associated child car seat, the rail system configured to move the associated child seat along a lateral direction of the vehicle seat assembly between a first outboard seating location and a center seating location defined by the seat base.

2. The vehicle seat assembly of claim 1, wherein the rail system includes at least one slide rail extended in the lateral direction between the first outboard seating location and the center seating location and a platform slidably mounted to the slide rail, the platform configured to have mounted thereto the associated child car seat.

3. The vehicle seat assembly of claim 2, wherein the platform includes at least one anchor for attachment of the associated child car seat to the platform.

4. The vehicle seat assembly of claim 2, wherein the rail system includes a lock device mounted to the slide rail or the platform for locking the platform at the first outboard seating location and the center seating location.

5. The vehicle seat assembly of claim 4, wherein the lock device is mounted to the platform and includes a lock pin for selectively engaging the slide rail, and further including a handle coupled to the lock pin for moving the lock pin out of engagement with the slide rail.

6. The vehicle seat assembly of claim 2, wherein the rail system includes a pair of slide rails extended in the lateral direction between the first outboard seating location and the center seating location, the platform slidably mounted to each of the slide rails.

7. The vehicle seat assembly of claim 2, wherein the cushion portion includes a first outboard cushion portion and a center cushion portion, each of the first outboard cushion portion and the center cushion portion is independently movable between the seating condition and the non-seating condition, and in the seating condition the first outboard cushion portion defines the first outboard seating location, and the center cushion portion defines the center seating location.

8. The vehicle seat assembly of claim 7, wherein the seat base defines a second outboard seating location, the cushion portion includes a second outboard cushion portion independently movable between the seating condition and the non-seating condition, in the seating condition the second outboard cushion portion defines the second outboard seating location, and the rail system is configured to move the associated child seat along the lateral direction between the first outboard seating location and the second outboard seating location.

9. The vehicle seat assembly of claim 8, wherein the at least one slide rail is extended in the lateral direction between the first outboard seating location and the second outboard seating location.

10. The vehicle seat assembly of claim 7, wherein the platform is sized smaller than each of the first outboard cushion portion and the center cushion portion, with the platform secured at the first outboard seating location the platform does not contact the center cushion portion in the seating condition, and with the platform secured at the center seating location the platform does not contact the first outboard cushion portion in the seating condition.

11. A vehicle seat assembly comprising:
a seat base connected to a seat back, the seat base having a cushion portion and a support portion for supporting the cushion portion, the cushion portion movable between a seating condition where the cushion portion forms a seating surface for accommodating an associated seated passenger and non-seating condition where the cushion portion is tilted forward relative to the seat back about a forward end portion of the support portion,
wherein a rail system is mounted to the support portion, in the seating condition the rail system is covered by the cushion portion, and in the non-seating condition the rail system is configured to have mounted thereto an associated child car seat, the rail system includes a pair of slide rails extended in a lateral direction of the vehicle seat assembly between a first outboard seating location and a center seating location defined by the seat base and a platform slidably mounted to the slide rails, the platform configured to have mounted thereto the associated child car seat.

12. The vehicle seat assembly of claim 11, wherein the platform includes at least one anchor for attachment of the associated child car seat to the platform.

13. The vehicle seat assembly of claim 12, wherein the rail system includes a lock device mounted to one of the slide rails or the platform for locking the platform at the first outboard seating location and the center seating location.

14. The vehicle seat assembly of claim 13, wherein the lock device is mounted to the platform and includes a lock pin for selectively engaging one of the slide rails, and further including a handle coupled to the lock pin for moving the lock pin out of engagement with the one slide rail.

15. The vehicle seat assembly of claim 11, wherein the cushion portion includes a first outboard cushion portion and a center cushion portion, each of the first outboard cushion portion and the center cushion portion is independently movable between the seating condition and the non-seating condition, and in the seating condition the first outboard cushion portion defines the first outboard seating location, and the center cushion portion defines the center seating location.

16. The vehicle seat assembly of claim 15, wherein the seat base defines a second outboard seating location, the cushion portion includes a second outboard cushion portion independently movable between the seating condition and the non-seating condition, in the seating condition the second outboard cushion portion defines the second outboard seating location, and the rail system is configured to move the associated child seat along the lateral direction between the first outboard seating location and the second outboard seating location.

17. A method of securing an associated child car seat to a vehicle seat assembly, the vehicle seat assembly including:
a seat base connected to a seat back, the seat base having a cushion portion and a support portion for supporting the cushion portion, the cushion portion includes a first outboard cushion portion and a center cushion portion, each of the first outboard cushion portion and the center cushion portion is independently movable between a seating condition and non-seating condition, and
a rail system mounted to the support portion and selectively covered by the cushion portion, the rail system is configured to have mounted thereto the associated child car seat, the rail system includes a pair of slide rails extended in a lateral direction of the vehicle seat assembly between the first outboard cushion portion and the center cushion portion and a platform slidably mounted to the slide rails,
the method comprising:
positioning the first outboard cushion portion in the non-seating condition;
mounting the associated child car seat to the platform;
positioning the center cushion portion in the non-seating condition;
sliding the platform having the associated child car seat mounted thereto in alignment with the center cushion portion; and
positioning the first outboard cushion portion in the seating condition.

18. The method of claim 17, wherein the platform includes at least one anchor, and the mounting step includes attaching the associated child car seat to the at least one anchor.

19. The method of claim 17, wherein the rail system includes a lock device mounted to the slide rails or the platform, and method includes:
locking the platform to at least one of the slide rails prior to the mounting step;
unlocking the platform from the one slide rail prior to the sliding step; and
locking the platform to the one slide rail after the platform is in alignment with the center cushion portion in the non-seating condition.

20. The method of claim 19, wherein the lock device includes a lock pin and a handle coupled to the lock pin, and the method includes engaging the one slide rail with the lock pin, and moving the handle to move the lock pin out of engagement with the one slide rail.

* * * * *